Figure 1:
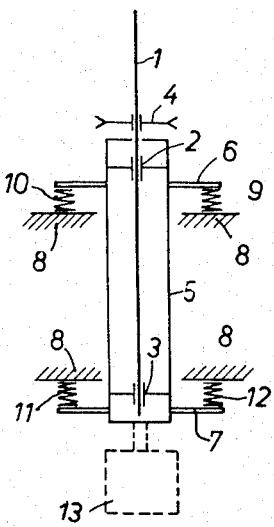

March 5, 1968 — K. BEERLI — 3,371,970

MOUNTING FOR HIGH-SPEED VERTICAL SHAFTS

Filed July 5, 1966 — 2 Sheets-Sheet 1

Karl Beerli,
INVENTOR.

BY Wenderoth, Lind and Ponack
Attorneys

March 5, 1968  K. BEERLI  3,371,970
MOUNTING FOR HIGH-SPEED VERTICAL SHAFTS
Filed July 5, 1966  2 Sheets-Sheet 2

Karl Beerli,
INVENTOR.
BY Wenderoth, Lind
and Ponack
Attorneys

United States Patent Office 3,371,970
Patented Mar. 5, 1968

3,371,970
MOUNTING FOR HIGH-SPEED VERTICAL SHAFTS
Karl Beerli, Niederuster, Zurich, Switzerland, assignor to Spindel-, Motoren- und Maschinenfabrik A.G., Uster, Zurich, Switzerland
Filed July 5, 1966, Ser. No. 562,685
Claims priority, application Switzerland, July 8, 1965, 9,576/65
16 Claims. (Cl. 308—140)

The present invention relates to a mounting for high-speed vertical shafts that greatly reduces the amount of vibration transmitted to the mouintg support.

It is a fact today that ever higher r.p.m.'s are demanded of rotating machines. Increasing the shaft speed brings difficulties that appear not at all or but little at lower r.p.m.'s. One difficulty that arises is that the shaft mounting often determines and limits the maximum speed possible.

On the one hand a mounting should be as nearly friction free as possible, to keep friction losses within acceptable limits at very high r.p.m.'s; and on the other hand the mounting should be sufficiently robust to withstand the forces that appear at high shaft speeds. These forces primarily arise from the usually unavoidable imbalance of the rotating members. In order to fulfill at least partly these requirements, which are to an extent conflicting, it has been suggested to rotatably mount the shaft in a bearing sleeve and to resiliently mount the latter on a support. In this mounting, the bearing sleeve resiliently bears the out-of-balance forces arising from the rotation of the shaft, resulting in a to-and-fro movement of which the frequency depends on the shaft r.p.m. To keep this movement of the shaft and sleeve as small as possible, and to prevent the appearance of resonance, it has been further suggested to keep the natural frequency of the bearing sleeve and shaft as far as possible from that frequency corresponding to the r.p.m. by a suitable choice of the elastic properties of the bearing sleeve mounting and of the weight of bearing sleeve.

Unfortunately, prior art resilient mountings of the bearing sleeve reduce little or not at all the transmission to the support of undesirable vibration arising from the rotating shaft and the out-of-balance forces.

In accordance with the mounting of the invention, the transmission of vibration to the support is very appreciably reduced. At all times the support bears only or substantially only the force corresponding to the weight of the mounting and shaft.

The invention is grounded upon the fact that the major part of the vibrations transmitted to the support through the resilient mountings is the vertical component of these vibrations.

Figure 2:
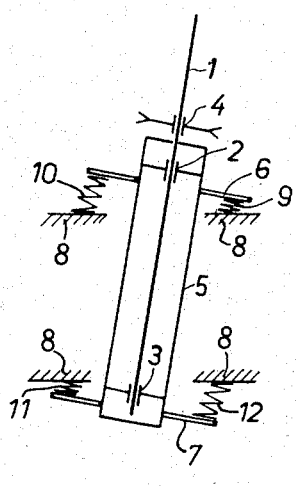
Figure 3:
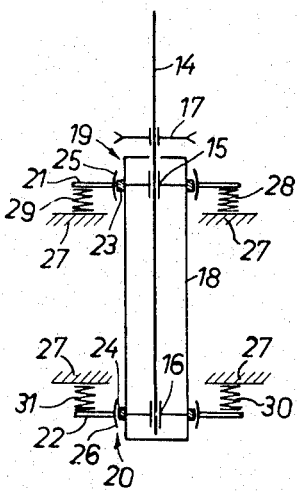
Figure 4:
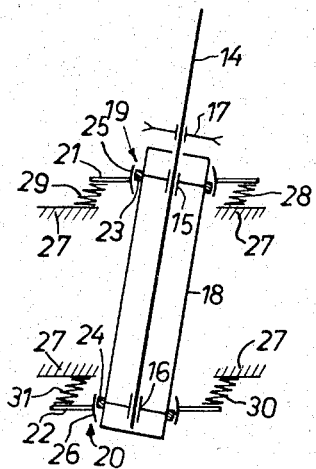
Figure 5:
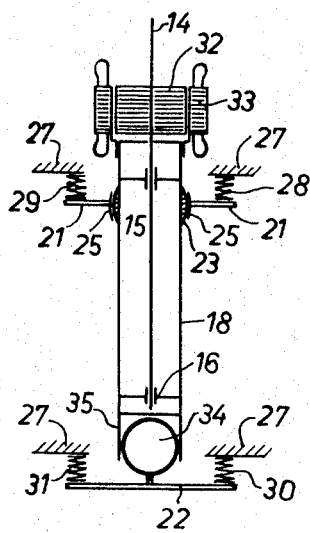
Figure 6:
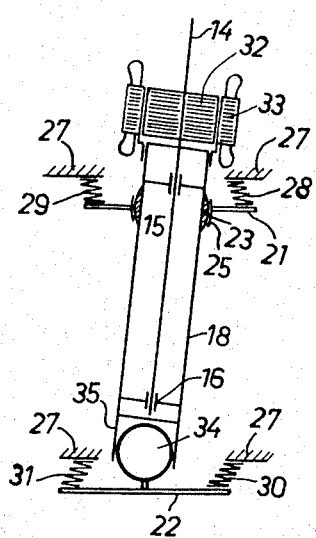
Figure 7:
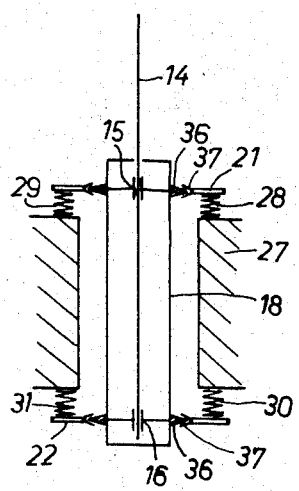
Figure 8:
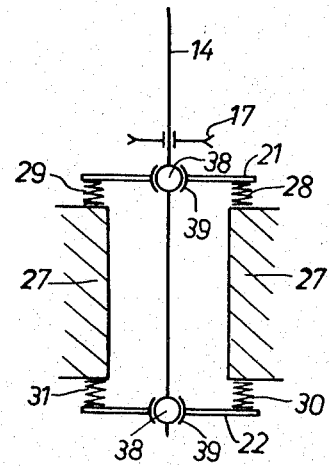

Four embodiments of the invention will now be described, with reference to the accompanying drawings, wherein:

FIGURES 1 and 2 show a mounting of the prior art;
FIGURES 3 and 4 show a first form of the invention;
FIGURES 5 and 6 show a second form of the invention; and
FIGURES 7 and 8 show each a third and fourth embodiment of the invention.

FIGURES 1 and 2 illustrate a known spindle mounting having several of the defects which the present invention avoids. The spindle shaft 1 is mounted in bearings, shown schematically at 2 and 3, for rotation by a suitable drive, such as a pulley 4 rigidly mounted on the shaft. A member (not shown), which may be a spinning can, a basket for centrifuging, a tool holder, or some other part to which is to be imparted a very high r.p.m., is attached to the upper end of the shaft. The bearings 2, 3, are mounted in spaced relationship in a bearing sleeve or jacket 5. The separation between the bearings 2, 3 depends, among other factors, on the bending stress applied to the shaft 1 in operation and the transverse play permitted the shaft by each of the bearings, 2, 3. The bearing sleeve is rigidly connected to two brackets 6, 7 spaced apart along the length of the sleeve. The brackets are resiliently mounted by springs 9, 10, 11, 12 or other suitable means on a stationary support 8. For the sake of simplicity, only two springs for each bracket are illustrated, although it will be understood that springs can be distributed around the entire bracket circumference. When the shaft 1 and the member on the upper end of the shaft are brought to a very high speed, there arise, in consequence of the imbalance present, out-of-balance forces. The direct bearing of these forces by the bearings 2, 3 is avoided by the resulting inclination of the sleeve 5 (greatly exaggerated in FIG. 2), which compresses springs 9, 11 and stretches springs 10, 12. The shaft and sleeve are illustrated at some given moment in their to-and-fro movement. The spring movement establishes force opposed to the imbalance forces and which exactly compensate for the latter at equilibrium. As is apparent from FIGURE 2, the counteracting forces have a component vertical to the pictured surface of support 8. Because in practice the shaft 1 tilts only a few degrees, this component is nearly parallel to the inclined shaft. To a very considerable extent this component is responsible for the undesired vibration of the sleeve.

It is possible to omit one of the brackets 6, 7. Or the natural frequency of the unit comprised of the shaft, bearings, sleeve, and brackets can be changed by the addition of a weight 13 to the sleeve 5, FIG. 1. However, this does not prevent the appearance of force components vertical to the support surface, when the shaft 1 is inclined.

In the embodiment of the invention shown at FIGURES 3, 4, there is illustrated an arrangement similar in certain respects to that of FIGURES 1, 2, in order to show more clearly the essence of the invention.

A shaft 14 is mounted for rotation in bearings 15, 16 and driven, for example, through a pulley 17 rigidly connected to the shaft. A member (not shown) is connected to the upper shaft end for rotation.

The bearings 15, 16 are mounted in spaced relationship in a bearing sleeve or housing 18. At spaced locations 19, 20 the sleeve is mounted for inclination in all directions in supports or housings 21, 22, which are shown, to avoid unnecessary complication of the figures, as disk-shaped. Rings 23, 24, secured to the sleeve 18 and having each a circumferential surface that is round in a plane transverse to the ring plane, cooperate with round opposed bearing surfaces 25, 26 rigid with the housings 21, 22. If desirable or necessary, any known means can be provided for preventing rotation of the sleeve 18 with respect to the housings 21, 22.

The housings 21, 22 are mounted for horizontal movement on a stationary support 27. The mountings can be springs 28–31, or any other suitable means that supplies an opposing force when the bearing housings move from their normal positions.

When the shaft 14 is brought to a sufficiently high speed to bring the out-of-balance forces into play, the shaft 14, sleeve 18, and bearings 15, 16 are inclined, FIGURE 4 showing at some given moment the inclination greatly exaggerated. The housings 21, 22 do not tip, however, because the sleeve 18 is free to move with respect to the housings. The housings simply are horizontally shifted; and, aside from their own weight, do not transmit any forces acting vertically to the surfaces of support 27. In this way the chief cause of the troublesome and occasionally destructive vibrations in the support 27 are avoided.

FIGURES 5, 6 illustrate a second form of the invention. Elements of this form corresponding to those of the previous embodiment have the same reference numerals. Instead of a pulley the rotor 32 of a high-frequency motor is rigidly connected to the shaft 14. The stator 33 of the motor is mounted against rotation on bearing sleeve 18. The motor serves as a direct drive for the shaft, and is connected via a switch (not shown) to a current source. The bearing sleeve or housing 18 is mounted for inclination in two housings 21, 22. Associated with the upper bearing housing 21 there is, as in FIGURES 3, 4, a ring 23 secured to the sleeve 18 and having a round surface that cooperates with the round concave surface of the bearing 25, whereas the mounting of the sleeve 18 in the lower housing 22 is designed as a ball pivot. A ball 34, mounted in the housing 22, engages a lower extension 35 of the sleeve 18. The internal diameter of the extension 35 and the outer diameter of the ball 34 are so proportioned as to constitute a ball pivot between the sleeve 18 and the housing 22. Both housings 21, 22 are resiliently mounted on a support 27 for horizontal movement. The mounts are shown as springs 28–31. As seen from FIGURE 6, the operation of this form of the invention is simliar to that of FIGURES 3, 4. It does not matter whether the surfaces of 27 face some upwards and some downwards or all upwards or downwards. It is only important that each bearing housing or support 21, 22 remain in a plane perpendicular to the shaft 14 at rest, that it be mounted for horizontal movement in all directions, and that it be subject to a restoring force as soon as it is moved from its position of rest.

A third embodiment is schematically shown at FIGURE 7. Again, corresponding elements are referenced with the same numbers as in the preceding forms. The shaft 14 is driven by any suitable means, not shown. The pivotal mounting of the bearing sleeve 18 in the housings 21, 22 is effected by elastomeric rings 36 that engage in an annular T-slot 37 in the housings 21, 22. The sleeve 18 is thus pivotally connected to the housing 21, 22, the rings 36 acting as tightly clamped elastic diaphragms. This form of the invention provides a progressively increasing restoring force acting on the sleeve 18, as the shaft 14 inclines from its customary position. The springs 28–31 are sufficiently stiff with respect to the stiffness of the rings 36 that the springs are not compressed when the shaft and sleeve incline.

A further form of the invention is shown at FIGURE 8. The shaft 14 is mounted for rotation and pivoting in two vertically spaced housings 21, 22. Balls 38 are coaxially, rigidly mounted on the shaft, for turning in partly spherical sleeves 39 that are rigidly connected to the housings 21, 22. This construction obviates the necessity of a bearing sleeve 18. The shaft 14 is driven by a pulley 17. The spring mounts 28–31 permit the housings 21, 22 to move in any direction against the spring restoring force.

In the different embodiments, it has been observed that the transmission of vibration to the support 27 is almost completely eliminated, if the shaft 14 is mounted for rotation and pivoting in one of the two housings 21, 22 and only for rotation in the other housing. The housings in any case are mounted for resilient horizontal movement against a restoring force.

The mounting can be improved by employing an elastomeric material as the bearing material at the pivot points, somewhat in the manner described in connection with the form of FIGURE 7. For example, the rings 23, 24 (FIGS. 3–6) and/or the bearing surfaces 25, 26 (FIGS. 3–5) or the extension 35 and ball 34 (FIGS. 5, 6) can partly or completely be composed of a low-friction elastic material over their contact areas. Suitable materials are nylon, that known under the trademark Teflon, and polyamide coatings.

Horizontal rails or slots can be provided for guiding the movement of the supports or housings 21, 22. For providing the restoring force elastomeric mountings or pneumatic or hydraulic pistons can be substituted for the springs 28–31. The bearings 15, 16 may be sleeve or ball bearings or fluid or gas bearings. The choice of bearings will depend largely on the load placed on the shaft, the invention not being limited to any particular kind of bearings 15, 16. The shaft can be directly or indirectly driven and at any point along its length: that is, at its top or bottom end or at some point between the bearings 15, 16. The direct drive of FIGURES 5, 6 is applicable also to FIGURES 3, 4 and 7.

In those cases where the support 27 does not surround the bearing sleeve 18, the supports or housings 21, 22, serving as cantilevers, are resiliently mounted at their one ends on the support 27, and the sleeve or housing 18 is mounted for pivoting on the other end of the parts 21, 22. The members 25 or 37 or 39 are constructed as previously described, but may be connected over only a portion of their circumference to the parts 21, 22.

The bearings 15, 16 need not necessarily be aligned with the parts 21, 22, respectively.

I claim:

1. A mounting for high-speed vertical shafts, including: a vertical shaft; two support means spaced along the length of the shaft for supporting the shaft; first means for resiliently mounting each of said support means for horizontal and vertical movement on a further support; and second means for permitting inclination of the shaft with respect to at least one of said support means; and bearing means for permitting rotation of the shaft.

2. A mounting for high-speed vertical shafts according to claim 1, including a housing for enclosing said bearing means, said second means permitting movement of said housing about axes lying in a horizontal plane, and said support means cooperating with said housing.

3. A mounting for high-speed vertical shafts according to claim 1, wherein said support means each surround said shaft.

4. A mounting for high-speed vertical shafts according to claim 2, including an electric motor of which the rotor is mounted on said shaft and the stator on said housing.

5. A mounting for high-speed vertical shafts according to claim 2, wherein said second means includes at least one elastomeric member secured to said housing and held by one of said two support means.

6. A mounting for high-speed vertical shafts according to claim 5, wherein said member is a ring.

7. A mounting for high-speed vertical shafts according to claim 1, wherein said second means is a ball pivot.

8. A mounting for high-speed vertical shafts according to claim 1, wherein said second means and said bearing means together comprise a ball pivot.

9. A mounting for high-speed vertical shafts according to claim 1, wherein said bearing means are located at two locations along said shaft substantially level with said two support means.

10. A mounting for high-speed vertical shafts according to claim 1, wherein said first means supply a restoring force dependent on the amount of horizontal movement of said two supports.

11. A mounting for high-speed vertical shafts according to claim 2, wherein said second means includes a first ring surrounding said housing, the face of said first ring being toroidal; a first annular, rounded bearing surface mounted on one of said two support means, surrounding said first ring in sliding contact with said toroidal surface.

12. A mounting for high-speed vertical shafts according to claim 11, wherein said second means includes a second ring surrounding said housing and spaced from the first ring, the face of said second ring being toroidal; a second annular, rounded bearing surface mounted on the other of said two support means, surrounding said first ring in sliding contact with said toroidal surface.

13. The mounting for high-speed vertical shafts according to claim 11, wherein said one support means is located above the other; and including a ball mounted on the other of said two support means, in sliding contact with the interior of said housing at the lower end thereof, for forming a ball joint therewith.

14. The mounting for high-speed vertical shafts according to claim 6, including two of said rings, each located substantially level with an individual one of said two supports and held thereby.

15. The mounting for high-speed vertical shafts according to claim 8, wherein said bearing means are located at two points spaced along said shafts; and including an annular bearing surface mounted on each of said two support means, surrounding at respective ones of said two points said bearing means in sliding contact therewith.

16. The mounting for high-speed vertical shafts according to claim 15, wherein said bearing means comprise two balls mounted coaxially on said shaft at respective ones of said two points.

References Cited
UNITED STATES PATENTS 3,097,167  7/1963  Beyerle _____ 308—143

MARTIN P. SCHWADRON, *Primary Examiner.*

FRANK SUSKO, *Examiner.*